United States Patent [19]

Glew et al.

[11] Patent Number: 5,564,111

[45] Date of Patent: Oct. 8, 1996

[54] METHOD AND APPARATUS FOR IMPLEMENTING A NON-BLOCKING TRANSLATION LOOKASIDE BUFFER

[75] Inventors: Andrew F. Glew, Hillsboro; Haitham Akkary, Portland; Robert P. Colwell, Portland; Glenn J. Hinton, Portland; David B. Papworth, Beaverton; Michael A. Fetterman, Hillsboro, all of Oreg.

[73] Assignee: Intel Corporation, Santa Clara, Calif.

[21] Appl. No.: 315,833

[22] Filed: Sep. 30, 1994

[51] Int. Cl.$^6$ .................................................. G06F 11/34
[52] U.S. Cl. ................. 395/185.06; 395/375; 364/262.4; 364/DIG. 1
[58] Field of Search ................................. 395/575, 375, 395/400, 425, 182.14, 182.15, 185.01, 185.02, 185.06, 823, 824, 829, 846; 364/256.4, 256.5, 961.4, 262.4, 256.3

[56] References Cited

U.S. PATENT DOCUMENTS

| | | | |
|---|---|---|---|
| 4,811,208 | 3/1989 | Myers et al. | 364/200 |
| 4,926,322 | 5/1990 | Stimac et al. | 364/200 |
| 5,123,101 | 6/1992 | Sindhu | 395/400 |
| 5,265,227 | 11/1993 | Kohn et al. | 395/400 |
| 5,390,310 | 2/1995 | Welland | 395/400 |
| 5,420,991 | 5/1995 | Konigsfeld et al. | 395/375 |
| 5,434,987 | 7/1995 | Abramson et al. | 395/375 |
| 5,442,757 | 8/1995 | McFarland et al. | 395/375 |
| 5,471,598 | 11/1995 | Quattromani et al. | 395/449 |
| 5,517,657 | 5/1996 | Rodgers et al. | 364/200 |

OTHER PUBLICATIONS

Gleason et al; VLSI circuits for low–end and midrange PA–RISC Computers, Aug. 1992, p. 12 (11).

Patel et. al.; The i860: heart of a high–performance workstation. (Intel 80860 RISC microprocessor); Nov. 13, 1989; p. 532 (2).

Primary Examiner—Robert W. Beausoliel, Jr.
Assistant Examiner—Albert Decady
Attorney, Agent, or Firm—Blakely, Sokoloff, Taylor & Zafman

[57] ABSTRACT

A non-blocking translation lookaside buffer is described for use in a microprocessor capable of processing speculative and out-of-order instructions. Upon the detection of a fault, either during a translation lookaside buffer hit or a page table walk performed in response to a translation lookaside buffer miss, information associated with the faulting instruction is stored within a fault register within the translation lookaside buffer. The stored information includes the linear address of the instruction and information identifying the age of instruction. In addition to storing the information within the fault register, a portion of the information is transmitted to a reordering buffer of the microprocessor for storage therein pending retirement of the faulting instruction. Prior to retirement of the faulting instruction, the translation lookaside buffer continues to process further instructions. Upon retirement of each instruction, the reordering buffer determines whether a fault had been detected for that instruction and, if so, the microprocessor is flushed. Then, a branch is taken into microcode. The microcode accesses the linear address and other information stored within the fault register of the translation lookaside buffer and handles the fault. The system is flushed and the microcode is executed only for faulting instructions which actually retire. As such, faults detected while processing speculative instructions based upon mispredicted branches do not prevent further address translations and do not cause the system to be flushed. Method and apparatus implementations are described herein.

18 Claims, 4 Drawing Sheets

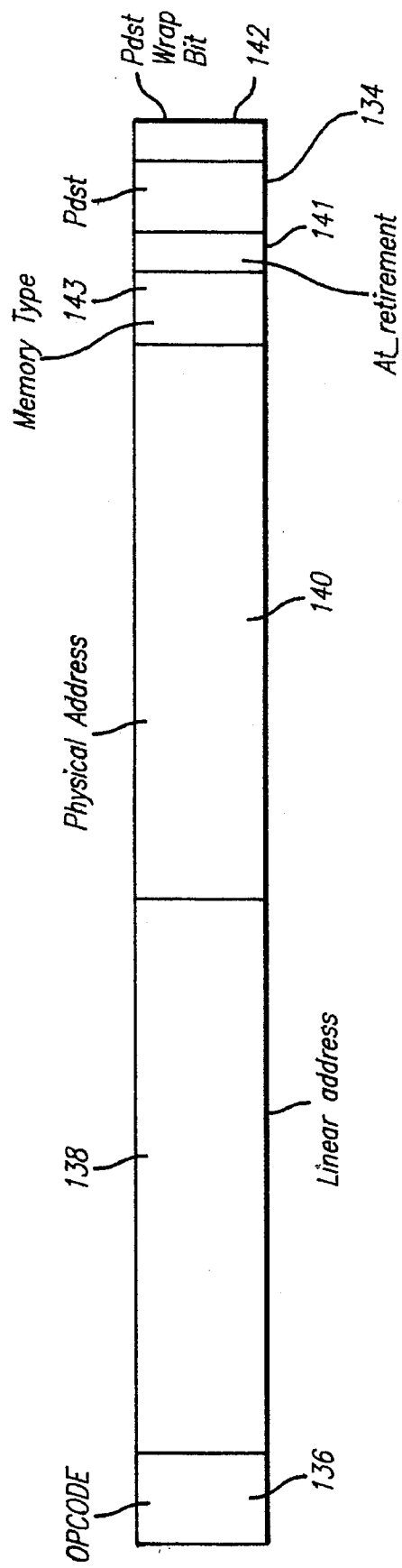
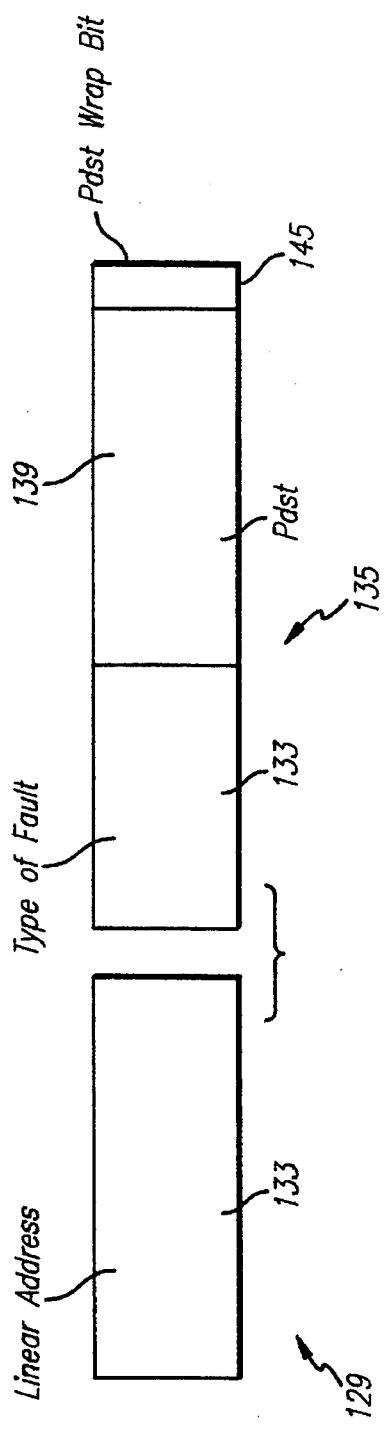
FIG. 3
FIG. 4

METHOD AND APPARATUS FOR IMPLEMENTING A NON-BLOCKING TRANSLATION LOOKASIDE BUFFER

BACKGROUND OF THE INVENTION

1. Field of the Invention

The invention generally relates to computer systems and in particular, to the implementation of a translation lookaside buffer ("TLB") within a computer system capable of performing speculative memory access operations.

2. Description of Related Art

Current state of the art microprocessors typically include one or more components for facilitating the processing of memory access operations. One such component is a data cache unit ("DCU") which stores a portion of data within a high speed memory. Typically, data from the most recently accessed external memory locations is stored within the DCU such that, if access to the data is required again, the data need not necessarily be retrieved from external memory. Another component commonly employed is a TLB which caches linear addresses and corresponding physical addresses for use in microprocessors wherein data is internally processed using only linear addresses. The TLB is used in connection with a page miss handler ("PMH") which performs a translation of a linear address to a physical address for those addresses not cached within the TLB. In use, the TLB is initially accessed to determine whether the TLB contains the physical address corresponding to a linear address identifying a desired memory location. If the linear address is found within the TLB, a "hit" is said to have occurred, and the physical address is merely loaded out of the TLB. If the linear and physical address are not cached within the TLB, then a TLB "miss" is said to have occurred and the PMH is accessed to perform a page table walk to determine the physical address corresponding to the desired linear address. Typically, a page table walk requires a considerable amount of execution time and may require two or more separate accesses to an external memory. It is primarily because the page table walk can be quite time consuming that the TLB is provided to allow for an immediate linear address translation for at least some of the linear addresses processed by the microprocessor.

During a TLB hit or during a page table walk in response to a TLB miss, a fault may be detected. Faults represent circumstances where normal processing of the loads or stores to the physical address cannot be properly processed. A wide variety of faults are commonly known. Examples include page and protection faults. In a page fault, the physical address identifies a page not presently held in memory which must be read from disk. A protection fault indicates that the physical address identifies a portion of memory for which the currently executing process does not have the privilege to access because, for example, the current process is a user program and the memory identified by the physical address corresponds to operating system ("OS") memory.

In conventional microprocessors, if a fault is detected, normal execution of the load or store causing the fault is suspended pending resolution of the fault. For microprocessors employing pipelined execution wherein portions of one or more loads or stores may be processed simultaneously, any loads or stores already in progress are aborted and flushed from the system. After the fault is resolved, the pipeline is reactivated and the additional loads or stores are re-executed. Microprocessors wherein processing of loads and stores is suspended or aborted upon the detection of a fault are said to have a "blocking" TLB, i.e., the TLB blocks processing of further instructions upon the detection of a fault.

Difficulties arise in the implementation of a blocking TLB for microprocessors capable of performing operations either out-of-order or speculatively. Out-of-order processing occurs when a microprocessor executes a micro-instruction, herein also referred to as an instruction, in advance of a later-generated instruction. In other words, actual execution of instructions need not be performed in the same order in which the instructions are generated or in which the instructions appear in a software program. Speculative processing occurs in a microprocessor capable of executing instructions which occur subsequent to a branch condition, such as an "If" statement, before the branch condition is actually resolved. In such systems, the microprocessor "guesses" as to which of two or more branches is likely to be taken. Such operations are termed "speculative" since it is not known whether the operations can actually be committed until the branch condition is resolved. If the branch prediction is found to be correct, then the speculatively executed instructions are committed to memory, i.e., the speculative instructions are "retired". If the branch prediction is found to be incorrect, then the speculatively executed instructions are squashed or flushed from the system.

As can be appreciated, the capability of performing operations speculatively can result in a great windfall in processing speed, since the microprocessor need not wait for a branch condition to be resolved prior to executing subsequent instructions. The advantages of performing operations out-of-order or speculatively is ideally exploited in microprocessors which are also capable of pipelined execution wherein two or more operations are performed simultaneously. General principles of out-of-order or speculative execution of instructions are described in "Superscalar Microprocessor Design" by Mike Johnson, Prentice-Hall, Inc. 1991.

Although speculative processing has considerable advantages over non-speculative processing, certain difficulties arise in handling faults within microprocessors capable of speculative execution. In particular, if a blocking TLB is employed, execution of instructions may be blocked as a result of a fault detected for a mispredicted speculative instruction. The blocking of subsequent instructions and the execution of fault handling routines would be unnecessary and wasteful for faults arising from instructions later determined to be mispredicted. Also, although fault handling problems have been described with reference to the TLB, similar problems may arise upon the detection of faults from other components of the microprocessor, such as the DCU.

The present invention is drawn, in part, to solving problems which arise in handling faults in microprocessors capable of speculative or out-of-order execution of memory, and other, instructions.

BRIEF SUMMARY OF THE INVENTION

The invention generally relates to methods and apparatus for handling faults in a microprocessor capable of speculative execution of instructions. In accordance with one aspect of the invention, a non-blocking TLB is provided within a microprocessor capable of speculative execution of memory instructions wherein the processing of instructions generated subsequent to an instruction causing a fault are not blocked and the microprocessor system is not flushed until it has been determined conclusively whether the faulting instruction is a correct instruction or an instruction based upon a mispredicted branch condition.

The microprocessor may include, in addition to the TLB, an out-of-order engine for generating speculative instructions, a memory ordering buffer ("MOB") for ordering the execution of the memory instructions, a DCU for caching data subject to the memory instructions and a PMH for performing page table walks. The PMH is capable of performing page table walks speculatively. The out-of-order engine includes an instruction fetch and issue unit for issuing instructions, a reservation station ("RS") for storing and allocating instructions that have yet to be executed, and a re-ordering buffer ("ROB") for re-ordering and retiring instructions. Retirement involves committing a speculative instruction to a permanent state. The instructions generated by the out-of-order engine each include a value, herein denoted "PDST", which indicates a destination of the result of the instruction within the microprocessor and provides an indication of the order relative to other instructions. The instructions are processed in an execution pipeline by the microprocessor.

In an exemplary embodiment, the non-blocking TLB is implemented as follows. A fault register is provided in connection with the TLB. Upon the detection of a fault, either during a TLB hit or during a page table walk in response to a TLB miss, information identifying the fault and the faulting instruction are stored within the fault register. Information stored in the fault register includes the linear address of the faulting memory access, the PDST value, as well as information uniquely identifying the faulting instruction. Minimal information identifying the faulting instruction is also transmitted to the ROB. However, other information, such as the linear address, is not transmitted directly to the ROB. Upon retirement of each instruction, the ROB accesses the information received and determines whether the retiring instruction generated a fault condition within the TLB. If so, the ROB initiates a process whereby all uOP's issued subsequent to the faulting uOP are flushed and a branch into microcode is triggered. The microcode directly accesses the information stored in the fault register to determine the type of fault. The microcode then processes the fault condition, perhaps in accordance with conventional techniques, to resolve the fault. Once the fault is resolved, all instructions generated subsequent to the generation of the faulting instruction are reissued from the instruction fetch and issue unit, if necessary. Hence, the instruction pipeline is restarted following the processing of the fault.

In this manner, only faulting instructions which actually retire result in flushing of the system. Faults based upon mispredicted branches do not result in flushing of the system. As such, valuable execution time is not wasted and the unrecoverable errors, described above, are avoided.

The TLB may detect more than one faulting instruction before any of the faulting instructions retire. Rather than store information corresponding to all of the faulting instructions, the TLB utilizes the fault register to store only the information corresponding to the oldest of the faulting instructions. Upon the detection of a faulting instruction, the TLB determines whether the fault register already stores information for a faulting instruction. If so, the TLB compares the age of the new faulting instruction with that of the storage faulting instruction to determine which is older. The age determination is achieved by comparing the PDST values for the two instructions. If the new faulting instruction is older than the previous faulting instruction, then the information that is stored within the fault register is overwritten. If not, information corresponding to the new faulting instruction is merely discarded. As such, the TLB stores only the information corresponding to the oldest faulting instruction at any one time. Such is sufficient because, upon the retirement of the oldest faulting instruction, subsequent instructions will be flushed from the system. As such, it is unnecessary to store information corresponding to any younger faulting instructions. It should be noted that the age processed by the TLB is representative of the time at which the faulting instruction would be executed in the dynamic instruction flow of a sequential processor and is not representative of the time the fault actually occurred.

In an exemplary embodiment described herein, the TLB includes a data TLB ("DTLB") and a separate instruction TLB ("ITLB"). The DTLB is non-blocking whereas the ITLB is blocking.

In its various embodiments, the non-blocking TLB invention allows for the more efficient processing of faults. Thus, the broad objectives set forth above are achieved. Other advantages, objects, and features of the invention will be apparent from the drawings and from the detailed description of the invention provided herein. In particular, although the invention is described primarily with reference to a non-blocking TLB, principles of the invention may be applied to other microprocessor components capable of determining fault information.

BRIEF DESCRIPTION OF THE DRAWINGS

FIG. 3 is a block diagram illustrating a microinstruction executed by the microprocessor of FIG. 2.

FIG. 4 is a block diagram illustrating the fault register of the TLB of FIG. 2.

DETAILED DESCRIPTION OF THE INVENTION

Referring to the figures, exemplary embodiments of the invention will now be described.

Figure 1:
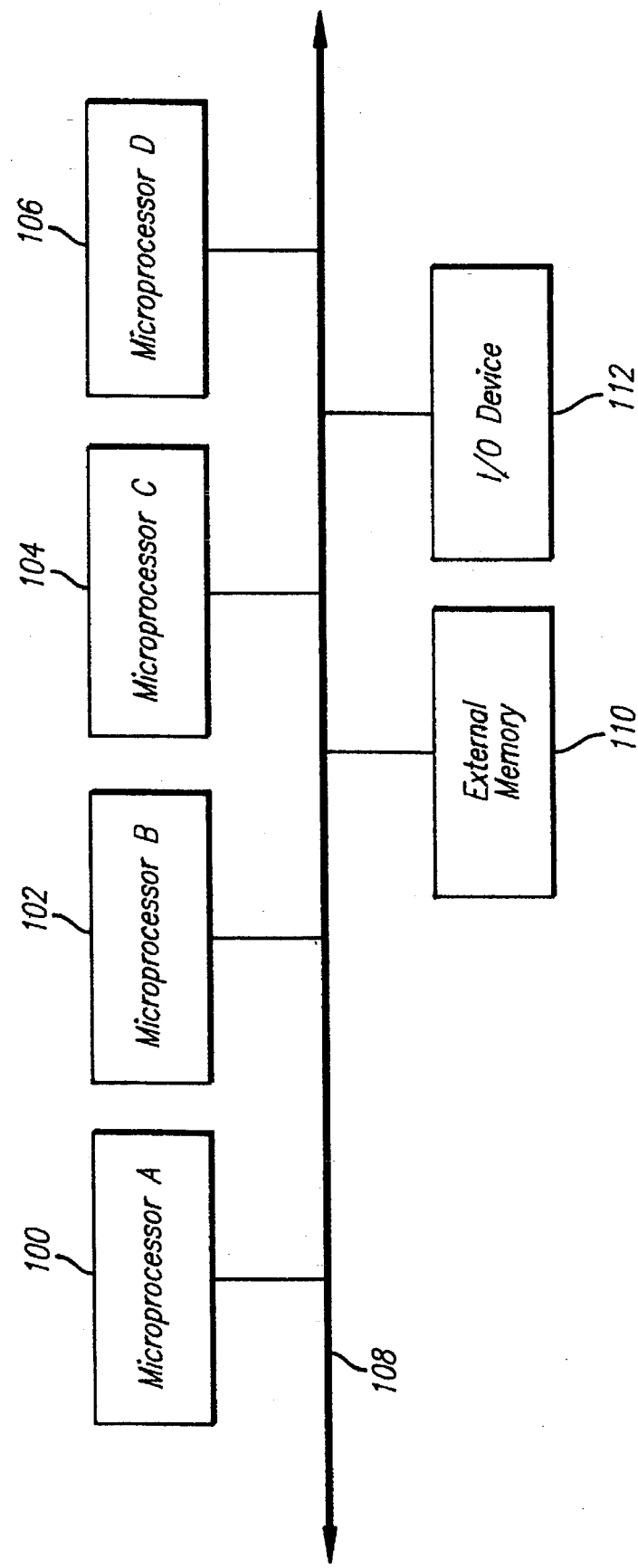
FIG. 1 is a block diagram illustrating a computer system having multiple microprocessors, each configured to incorporate aspects of the invention.

FIG. 1 illustrates a multiprocessor computer system having four individual microprocessors 100, 102, 104, and 106 interconnected by a system bus 108. A main memory 110 and an input/output device 112 are also connected to system bus 108. Main memory 110 may include a wide range of memory storage units including ROM's, RAM's and the like. I/O device 112 may include any of a number of input or output devices such as keyboards, CRT displays, and the like. Each of the microprocessors illustrated in FIG. 1 may be identical. As will be described more fully below, each microprocessor is capable of speculative execution of instructions.

Figure 2:
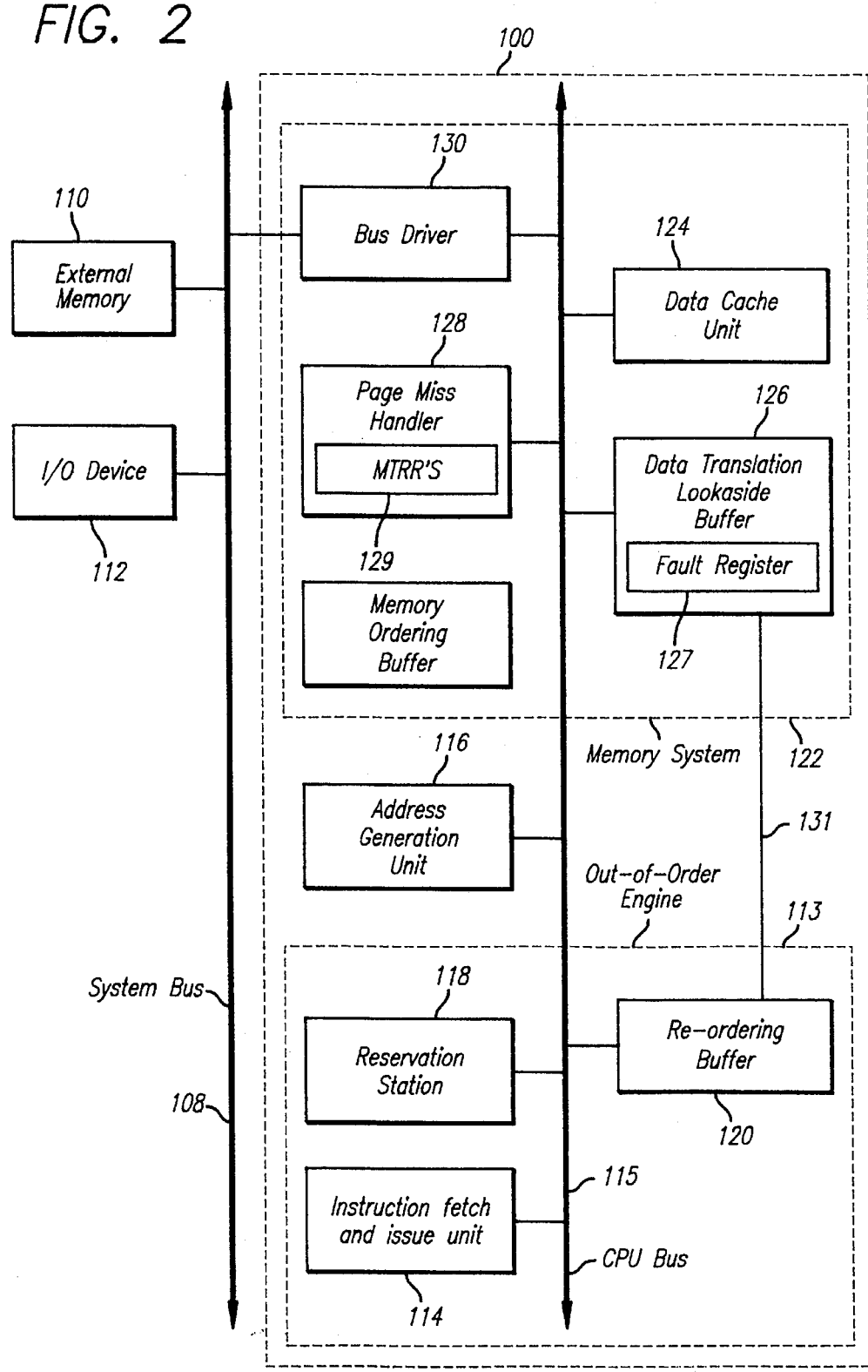
FIG. 2 is a block diagram illustrating selected functional components of one of the microprocessors of FIG. 1, particularly illustrating a non-blocking TLB.

FIG. 2 illustrates selected functional components of microprocessor 100 of FIG. 1. In particular, FIG. 2 illustrates an out-of-order engine 113 which generates computer instructions (also referred to herein as micro-operations or "uOP's") such as memory loads and stores. The uOP's are, in general, generated by out-of-order engine 113 in a sequence which may differ from the sequence in which the instructions appear within a computer program. Further, out of order engine 113 is capable of making predictions at branch conditions, such as "If" statements, then speculatively generating instructions subsequent to the branch condition. The instructions are generated out-of-order or speculatively, in part, to allow microprocessor 100 to exploit any parallelism within the computer code to be executed and to exploit pipelining capabilities of the microprocessor.

Out-of-order engine 113 includes an instruction fetch and issue unit 114 for issuing uOP's and an RS 118 for allocating uOP's that have not yet been executed, then dispatching the uOP's to other functional units according to speculative data dependencies and according to the availability of the other functional units.

Out-of-order engine 113 also includes a ROB 120 which stores speculative results from instructions dispatched by RS 118 and executed by one of the functional units. ROB 120 collects the results from speculative uOP's, reorders the uOP's, then retires the uOP's. Thus, whereas the uOP's may be dispatched from out-of-order execution engine 113 in an order other than that which appears in a computer program, ROB 120 reorders the uOP's to yield the sequence of events specified by the computer program.

The linear addresses for instructions dispatched by RS 118 are calculated by address unit 116. The uOP's are dispatched from out-of-order engine 113 in either a protected mode or in a real mode. In protected mode, the linear address for the uOP is calculated by AGU 116. In real mode, AGU 116 calculates a physical address for the uOP. In the following, protected mode operation will be assumed. The uOP, containing the linear address or physical address, is output from AGU 116 onto CPU bus 115 for routing to a functional unit of the microprocessor for execution of the uOP.

uOP's which involve memory accesses such as memory loads and memory stores are executed by a memory system 122. Memory system 122 includes a DCU 124, a DTLB 126, a PMH 128, a memory system bus driver 130, and a MOB 132. DTLB 126 maintains a cache of address translations between linear addresses and corresponding physical addresses.

In use, a uOP dispatched by RS 118 is intercepted from CPU bus 115 by DTLB 126 which performs a look-up to determine whether its internal cache lines contain the physical address corresponding to the linear address of the uOP. If the address translation is found therein, i.e. if a hit occurs, DTLB 126 re-dispatches the uOP, updated to include the physical address, onto CPU bus 115. If a miss occurs, DTLB 126 re-dispatches the uOP and notifies the PMH that a page table walk must be performed to determine the physical address corresponding to the linear address of the uOP.

DTLB 126 may detect a fault either from information retrieved from internal cache lines of the DTLB during a hit or from information provided by the PMH in response to a page table walk. If a fault is detected, information identifying the faulting uOP and the linear address corresponding thereto is stored in a fault register 127. Information identifying the faulting uOP is also transmitted directly to ROB 120 along a dedicated connection line 131. Despite the detection of a fault, processing of further uOP's continues and additional page table walks may be performed. The structure of fault register 127 and the method by which faults are processed will be described in greater detail below.

With regard to the DTLB, it should also be noted that internal cache lines of the DTLB also store a memory-type value which indicates whether the physical address of the memory access specified by the uOP contains speculatable information or non-speculatable information. To allow the DTLB to access the memory-type value, regardless of the operating mode of the microprocessor, the DTLB is preferably configured to operate both in protected mode and in real mode. Details regarding the implementation of a real mode DTLB may be found in U.S. patent application Ser. No. 08/176,364, filed Dec. 30, 1993, entitled "Method And Apparatus For Using A Translation Lookaside Buffer In Real Mode", assigned to the assignee of the present application and incorporated by reference herein. Information describing the memory type can be found within U.S. patent application Ser. No. 08/171,528, filed Dec. 22, 1993, entitled "Method And Apparatus For Determining Memory Type By A Processor", which is assigned to the assignee of the present application and which is incorporated by reference herein.

DCU 124 includes internal cache lines maintaining data for many of the most recently accessed memory locations. DCU 124 intercepts the uOP containing the physical address and accesses internal cache lines to determine if the data for the memory access of the uOP is already contained therein. If the data is contained within DCU 124, the data is retrieved from the internal cache lines and dispatched onto CPU bus 115 for further processing by other functional units of microprocessor 100, such as ROB 120. If the data is not found within DCU 124, system bus driver 130 is accessed to transmit memory requests to external memory 110 to access the data specified by the uOP. Preferably, DCU 124 is capable of processing data using any one of several cache protocols such as write-back and write-through cache protocols. The memory-type value cached within DTLB 126 is preferably used in determining which cache protocol is appropriate for a particular uOP.

In the event that the translation between the linear address and a physical address is not cached within DTLB 126, i.e. when a miss occurs, then PMH 128 performs a page table walk to determine the corresponding physical addresses. If the uOP causing the DTLB miss is a non-speculative uOP, PMH 128 merely performs a non-speculative page table walk. If, however, the uOP causing the DTLB miss is a speculative uOP, then PMH 128 performs a page table walk speculatively. The details of the operation of the PMH, particularly with respect to speculative page table walks, is provided within U.S. patent application Ser. No. 08/176,363, filed Dec. 30, 1993, entitled "Method And Apparatus For Performing Page Table Walks In A Microprocessor Capable Of Processing Speculative Instructions", which is assigned to the assignee of the present application, and which is incorporated here by reference. PMH 128 also includes a set of memory-type range registers (MTRR's) 129 which relate physical addresses to memory types to facilitate the determination of the memory type.

MOB 132 orders memory accesses. More specifically, MOB 132 maintains lists (not shown) of memory loads and stores and checks the loads and stores for possible adverse memory effects. MOB 132 reorders the memory access operations accordingly and may postpone execution of particular memory access operations until ordering problems are resolved. In particular, MOB 132 blocks execution of any memory uOP's that are not at retirement and are known to be non-speculatable.

An exemplary uOP 134 is symbolically illustrated in FIG. 3. uOP 134 includes an operational code (OPCODE) 136, a linear address 138, a physical address 140 and a physical destination address (PDST) 142. OPCODE 136 indicates the type of operation to be performed and may, for example, identify a memory store or memory load operation. PDST stores a code which indicates the order of the uOP relative to other uOP's and which may further identify the destination within microprocessor 100 of the results of the uOP. Linear and physical address sections 138 and 140 store the linear and physical addresses, respectively, if known. uOP 134 also stores an at-retirement bit 141 and a memory-type value 143. At-retirement bit 141 identifies whether the uOP is executing at retirement. As noted above, if a uOP is at retirement, it is no longer speculative. A uOP which is not yet at retirement may be speculative. Memory-type value 143 is a value indicating, for example, the speculatability of the memory location to be accessed by the uOP. Unless the memory type value is found within DTLB 126 as a result of a DTLB hit, the memory-type may not be known. The memory type is initially determined during a page table walk performed in response to the DTLB miss by accessing MTRR's 129.

uOP 134 may additionally include a wide range of other information for facilitating the processing and execution of the uOP. For brevity and clarity, such additional information is not described herein. In practical implementations, uOP need not store both the linear and physical addresses. Indeed, the linear and physical addresses may be carried on separate buses within the microprocessor. Further information regarding the uOP's structure may be found in the above-identified co-pending patent applications.

Now considering the PDST value in greater detail. The PDST value identifies an entry allocated for the uOP in the ROB. Execution units such as the DCU which return results from a completed uOP assert a PDST value and an associated valid bit onto the CPU bus to indicate to the RS and the ROB that data for the uOP is being written back. Since uOP's are completed out-of-order, the ROB and RS need to know which results received, during a given write-back cycle, are associated with which instructions.

As will be described more fully below, in response to the detection of a fault, DTLB 126 examines the PDST value of the current faulting uOP and compares that value with a PDST value of a previous faulting uOP, if there is one, stored within fault register 127. If the current faulting uOP is older than the previously stored faulting uOP, then the information within fault register 127 is overwritten to reflect the new faulting uOP. The DTLB also transmits information identifying the uOP, taken from a portion of the PDST, to the ROB where it is stored pending retirement of the uOP. As a uOP is retired by the ROB, the ROB uses the information to determine whether the retiring uOP generated a fault detected by the DTLB. If so, the ROB triggers a branch into microcode. The microcode accesses the information stored within fault register 127 and processes the fault condition in accordance therewith. Once the fault is resolved, all uOPs younger than the faulting uOP are squashed and the execution pipeline is reactivated. However, prior to the retirement of the oldest faulting uOP, DTLB continues to respond to translation requests and, when necessary, activates PMH 128 to perform page table walks in response to DTLB misses. As such, DTLB 126 is a non-blocking DTLB.

FIG. 4 illustrates fault register 129. As can be seen, fault register 129 includes two separate control registers 133 and 135. Control register 133 stores the linear address of the faulting uOP. Control register 135 stores information identifying the type of fault 137, the uOP PDST value 139 and a PDST wrap bit 145. Control register 135 may additionally store a wide variety of other information such as whether the CPU was in user mode when the fault occurred.

The DTLB performs the above noted age comparison by examining PDST value 139 in conjunction with PDST wrap bit 145. Regarding the PDST wrap bit, PDST values are generated by the RS (FIG. 2) in a sequential manner, beginning with, for example, a binary 00000 and continuing to a binary 11111. After the 11111 PDST is generated, subsequent PDST values wrap around and begin again at 00000. As such, a more recently generated uOP may have a PDST value which is numerically lower than a previously generated uOP. To resolve any ambiguities, PDST wrap bit 145 is set by the RS when the uOP is generated to indicate whether a wrap around has occurred. The RS hardware is implemented to prevent double wrap-around. Hence, a single wrap around bit suffices. Although the use of a single wrap-around bit provides an efficient mechanism for preventing double wrap-around, other mechanisms may be employed. Indeed, entirely different mechanisms for tracking the relative ages of uOP's may also be employed.

The DTLB performs the age comparison between the faulting uOP and the information stored in fault register 127 for a previous faulting uOP by comparing the two binary PDST values (134 of FIG. 3 and 139 of FIG. 4) along with the two wrap around bits (142 of FIG. 3 and 145 of FIG. 4) to determine which uOP is older.

FIGS. 1–4 illustrate only relevant functional components of the microprocessor system. For clarity, numerous implementation details are not explicitly shown. For example, the single CPU bus illustrated in the figures may actually include several separate bus lines including separate busses for linear addresses, physical addresses, write-back results from the DCU, and OPCODE's. Also, the separate physical address of the bus may be interconnected only to the PMH, DTLB and DCU. In other words, not all units may require access to physical addresses. The out-of-order engine may include separate internal components such as a sequential instruction fetch, a micro-code unit, an instruction decoder and an allocator unit. Also, integer and floating point units may be included within the microprocessor which are not expressly illustrated. A separate ITLB may also be provided which may be a configured as a blocking ITLB.

The foregoing provides a brief overview of the operation of microprocessor 100, particularly the manner by which the microprocessor handles faults detected by the DTLB. With reference to the remaining figures, the method and apparatus by which DTLB detected faults are processed will be described in greater detail.

Figure 5:
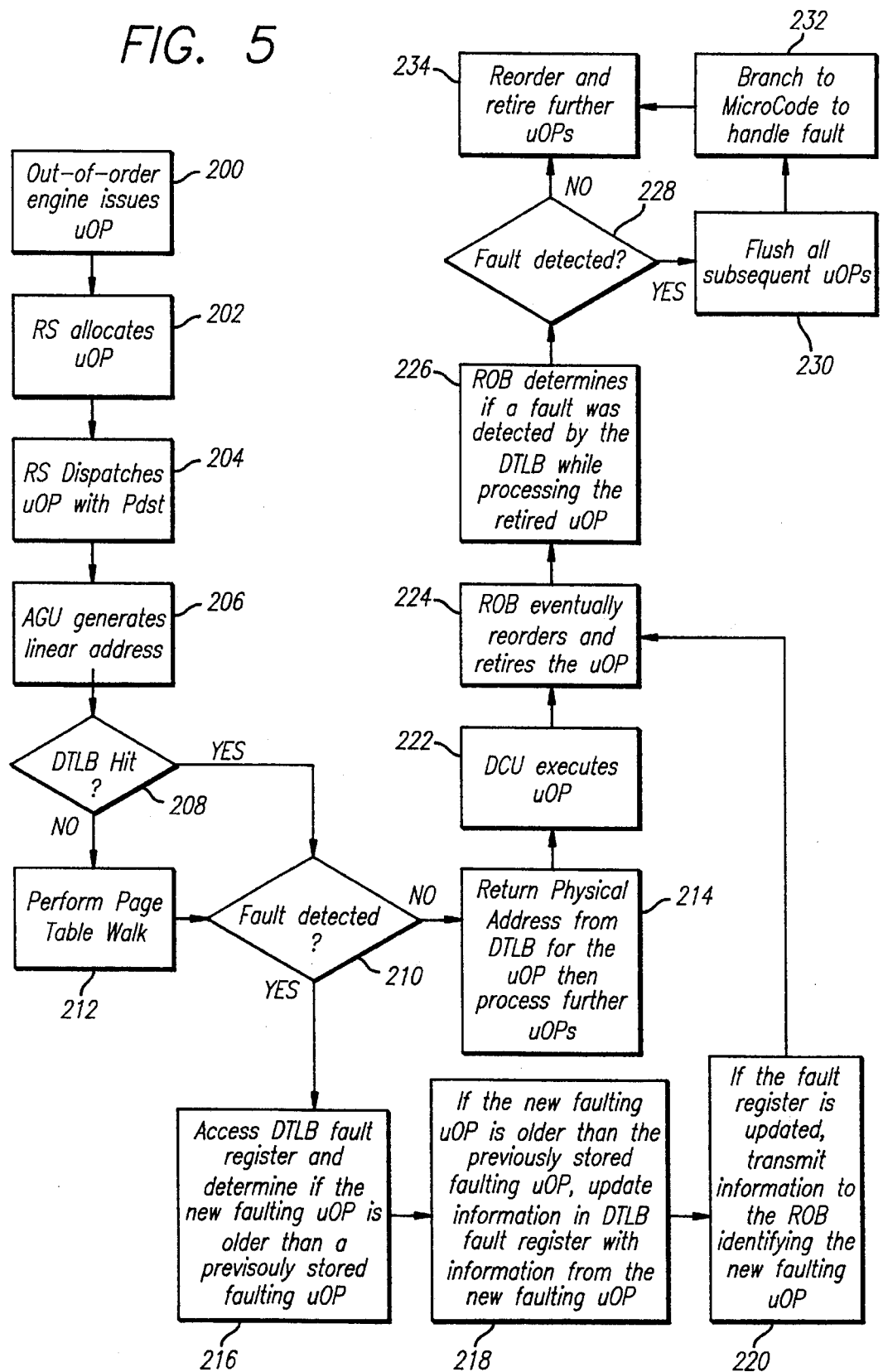
FIG. 5 is a flow-chart illustrating a method of implementing a non-blocking TLB employing the computer system of FIGS. 1–4.

FIG. 5 illustrates, in flow chart form, the method by which microprocessor 100 in general, and DTLB 126 and ROB 120, in particular, process DTLB faults based on possibly speculative uOP's. Although FIG. 5 illustrates method steps in a flow chart form, those skilled in the art will appreciate that each block of the flow chart may also represent a device or circuit within microprocessor 100 for performing the described action. In some cases, the action will be performed by dedicated hardware. In other cases, the action may be performed by micro-code or other types of software. The details by which the steps of FIG. 5 are actually implemented in hardware or software are not necessarily pertinent to the invention and will not be described in detail, unless noted.

The steps of FIG. 5 will be described with continued reference to the microprocessor block diagram of FIG. 2 and to the fault register block diagram of FIG. 4. Initially, at 200, the instruction fetch and issue unit generates and dispatches a uOP containing a valid OPCODE and PDST value. Although the instruction fetch and issue unit generates a wide variety of uOP's, only memory access uOP's, such as memory loads and memory stores, will be considered herein in detail.

The uOP is intercepted by RS 118 which allocates the uOP, then dispatches the uOP to AGU 116 along CPU bus 115 (FIG. 2). The RS allocate and RS dispatch operations are identified in FIG. 5 by steps 202 and 204, respectively.

After the uOP is dispatched by RS 118, AGU 116 calculates the linear address for the uOP and stores the linear address in linear address space 138 of uOP 134 (FIG. 3). The calculation of the address is performed in step 206 of FIG. 5.

Memory system 122 receives the uOP along CPU bus 115 (FIG. 2). The uOP received by memory system 122 includes a PDST value and a bit indicating whether the uOP is at retirement. For the exemplary uOP under consideration, which has just been generated by the out-of-order execution engine, the uOP is not yet at retirement and the AT-RETIREMENT bit is therefore set accordingly. However, the memory system also receives other uOP's which may already be at retirement.

Once within the memory system, the uOP is intercepted by DTLB 126 (FIG. 2) which attempts to perform a translation of the linear address within the uOP to a corresponding physical address. The translation is attempted by accessing cache lines within the DTLB 126 to determine whether the linear address/physical address combination is already contained therein. At step 208 of FIG. 5, DTLB 126 determines whether the uOP results in a DTLB "hit" or a DTLB "miss". If a hit occurs, that is, the linear address/physical address combination is contained within the DTLB 126, then execution proceeds to step 210 where the DTLB determines whether a fault occurred. A fault may be detected by the DTLB in accordance with conventional caching techniques. Also, various status bits of the information returned from internal cache lines (not separately shown) of the DTLB may provide an indication of whether a fault has occurred.

At 208, if a DTLB miss occurred, execution proceeds to step to 212 where the PMH is triggered to perform a page table walk to determine the physical address corresponding to the linear address of the uOP. Once the physical address is determined, execution proceeds to step 210 for determination of whether a fault occurred. Hence, a fault determination is performed both in response to a DTLB hit and in response to a page table walk performed following a DTLB miss. If no fault is detected in step 210, execution proceeds directly to step 214 where the uOP is updated to include the appropriate physical address, and the uOP is re-dispatched onto CPU bus 115 (FIG. 2).

At step 222, the uOP is executed only if there was no fault to load or retrieve data to or from the physical address. Actual execution of the uOP is performed by DCU 124 (FIG. 2) which examines internal cache lines to determine whether the data subject to the uOP is already contained therein. If the data subject to the uOP is not stored within DCU 124, then external memory 110 (FIG. 2) is directly accessed through system bus driver 130 to retrieve or store the desired data. Actual external memory transactions may be deferred by the MOB, particularly if the uOP is speculative.

Once the data for the uOP has been properly processed by DCU 124, the uOP is re-dispatched with the data contained therein for further processing by other functional units such as RS 118 and ROB 120.

If a fault is detected at step 210, execution proceeds to step 216 where the DTLB begins to process the faulting uOP. More specifically, at step 216, the DTLB accesses the fault register to determine whether the register currently stores information corresponding to a previously detected faulting uOP. If the fault register is empty or otherwise contains invalid data, the DTLB stores information identifying the faulting uOP into the fault register. If, however, the fault register already stores valid information from a faulting uOP, the DTLB compares the PDST values and wrap bits of the new faulting uOP to the PDST value stored in the fault register to determine whether the new faulting uOP is older than the previous faulting uOP, step 218. If the new faulting uOP is older than the previously stored faulting uOP, then the DTLB overwrites the information within the fault register to reflect the new faulting uOP. If, however, the new faulting uOP is not older than the previously stored uOP then the information corresponding to the new faulting uOP is merely discarded. At step 220, information identifying the faulting uOP is transmitted to the ROB where the information is stored therein in an event information field described in further detail below. The information transmitted to the ROB includes only that information sufficient to identify the faulting uOP, the type of faults that occurred, and the source of the fault information, in this case the DTLB. The information transmitted to the ROB is transmitted along line 131 (FIG. 2). By transmitting only a few bits worth of information, rather than all information associated with the faulting uOP, such as the linear address, the number of interconnection lines from the DTLB to the ROB is minimized. Such is particularly desirable in a complex microprocessor implementation wherein available space on the microprocessor is limited. The fault information is transmitted only if the fault information is stored in the fault register. In other words, if the fault information was discarded at step 210 because the fault register already stored information from an older fault then the newer fault information is not transmitted to the ROB. Execution then proceeds to step 224 where the RS and ROB allocate and reorder the uOP in conjunction with many of other uOP's and eventually retire the uOP, resulting in the actual memory access subject to the uOP to be fully committed to memory. If the uOP is already at retirement, no such reordering is required by the RS/ROB. If the parent uOP is not yet at retirement, then reordering may be required. Details of the operation of the RS and ROB are not pertinent to the present invention.

At retirement of the uOP, the event information field of the ROB is accessed at step 226 to determine if a fault had been detected by the DTLB while processing the retired uOP. The event information field may be, for example, an eight-bit field stored within the ROB which identifies whether a fault or other exception occurred and whether the exception was a fault, trap, or an assist. The field also identifies the execution unit which detected the exception, in this case the DTLB.

If it is determined, at step 228, that a fault had occurred for the retiring uOP, all subsequent uOPs generated before the faulting uOP was originally generated are aborted, at step 230. Then, a branch is taken into microcode at step 232. More specifically, a microcode event handler is activated. Microcode is executed which accesses the information stored within the fault register, determines the appropriate action corresponding to the specific fault and in accordance with the execution unit detecting the fault (i.e. the DTLB), and processes the fault accordingly. The manner by which the microcode handles the fault may be entirely conventional (other than as it relates to the retrieval of information identifying the fault from the fault register). As such, details of microcode and its implementation will not be provided herein. During execution of the microcode, execution of uOPs is suspended. Once the microcode has finished processing the fault, execution proceeds to step 234 where uOPs generated before the faulting uOP are reordered and retired.

If a fault was not detected at step 228, execution proceeds directly to step 234. It should be noted that, in certain situations, it would be desirable to initiate the flush of previous uOPs (step 232) prior to branching into microcode (step 230). If system is flushed prior to the branch into microcode, it may be necessary to preserve the information that is stored within the fault register to allow the microcode to access the information stored therein.

Thus, FIGS. 1-5 illustrate a multiprocessor system wherein each microprocessor employs a non-blocking DTLB. Although the foregoing describes a method and apparatus for handling faults detected by only a DTLB, principles of the invention may also be employed for handling faults detected by other execution units of the microprocessor as well. In general, such other units may be each configured with a fault register and with appropriate means for transmitting faulting uOP information to the ROB such that subsequently generated microcode can resolve the fault by directly accessing the fault register. Examples of other execution units for which such may be appropriate include the DCU. Also, other exceptions, in addition to faults, may be processed.

Further with regard to the exemplary implementation described herein, the microprocessor of FIG. 2 may be configured with a separate ITLB. Although it may be desirable to implement the ITLB as a non-blocking ITLB, in a preferred implementation the ITLB is a blocking ITLB. Details of an exemplary blocking ITLB are described in the above identified patent application (docket number P1598).

What has been described is a method and apparatus for responding to faults within a microprocessor capable of a speculative execution of memory instructions. The microprocessor itself can be configured using a wide variety of fabrication techniques, including, for example, silicon or gallium arsenide techniques. Each component described above may be configured within a single integrated chip or on several chips. The microprocessor itself may be only one microprocessor within a multiprocessor environment. The method and apparatus are preferably configured in accordance with Intel Processor Architecture. However, principles of the invention may be applied to other microprocessor architectures as well and is not limited to an Intel Architecture. In general, the exemplary embodiments described herein are merely illustrative of the invention and the scope of the invention is not limited to those exemplary embodiments.

What is claimed is:

1. In a computer system employing speculative processing, the computer system including a translation lookaside buffer for performing linear address translation operations in response to linear address translation requests, the improvement comprising the translation lookaside buffer being adapted, in response to the detection of a fault during the linear address translation of an instruction, to continue to respond to linear address translation requests, and perform linear address translation operations, subsequent to the detection of the fault.

2. A method of responding to a fault detected during a linear address translation of a faulting instruction in a computer system employing speculative processing, and having a re-ordering buffer and a translation lookaside buffer, said method comprising the steps of:

storing information identifying the faulting instruction;

performing linear address translations for other instructions using the translation lookaside buffer subsequent to detection of the fault;

determining whether the faulting instruction retires; and if said faulting instruction retires, processing the fault detected during the linear address translation of the faulting instruction.

3. The method of claim 2, wherein said step of processing the fault comprises the steps of:

executing micro-code configured for handling the fault; and flushing the computer system of all subsequent instructions.

4. The method of claim 2, wherein said step of storing information identifying the faulting instruction comprises the steps of:

storing the linear address and a fault type value representative of the fault detected within a fault register connected to the translation lookaside buffer;

storing information identifying the faulting instruction within a register connected to the re-ordering buffer; and wherein said step of processing the fault includes the steps of:

determining that a fault had been detected for the faulting instruction by accessing the register connected to the re-ordering buffer; and accessing the fault register connected to the translation lookaside buffer to determine the fault type value and the linear address for the faulting instruction.

5. The method of claim 4, wherein the fault register further stores an age value, representative of an order position of an instruction relative to that of other instructions in a sequential instruction set, and wherein the step of storing information in the fault register includes the steps of:

determining whether information corresponding to a previous faulting instruction is stored in the fault register and, if so, comparing the age value of the faulting instruction with the age value of the previous faulting instruction to determine if the order position of the faulting instruction precedes that of the previous faulting instruction; and if the order position of the faulting instruction precedes that of the previous faulting instruction, overwriting said fault register with fault information corresponding to the faulting instruction and, if not, discarding the fault information corresponding to the faulting instruction.

6. A method for processing a fault detected during a linear address translation of a first faulting instruction in a computer system having a re-ordering buffer and a translation lookaside buffer, said method comprising the steps of:

storing information identifying the first faulting instruction in a register connected to the re-ordering buffer;

processing other linear address translations within the translation lookaside buffer;

detecting retirement of the first faulting instruction; and determining whether a fault had been detected for the first faulting instruction by accessing the register connected to the re-ordering buffer and, if a fault had been detected, processing the fault of the first faulting instruction.

7. The method of claim 6, wherein the step of processing of the fault is performed by execution of microcode.

8. The method of claim 6, including the steps of: storing age information representative of an order position of the first faulting instruction relative to that of other instructions in a sequential instruction set, in a fault register connected to the translation lookaside buffer;

detecting a fault during a linear address translation of a second faulting instruction by the translation lookaside buffer;

determining whether the second faulting instruction has an order position preceding that of the first faulting instruction by accessing information within said fault register and, if so, replacing the information stored within the fault register with information corresponding to the second faulting instruction.

9. The method of claim 8 wherein the determination of whether the second faulting instruction has an order position preceding that of the first faulting instruction is performed by comparing age information associated with the second faulting instruction with the age information of the first faulting instruction stored in the fault register.

10. The method of claim 6, wherein the step of processing the fault of the first faulting instruction includes the steps of:

transferring fault information including the linear address of the faulting instruction into a register which is accessible by user software; and executing user software configured for handling said fault, said user software accessing said register accessible by said user software.

11. A computer system comprising:

means for issuing instructions, some of which are speculative instructions;

non-blocking translation lookaside buffer means for performing an address translation for each of said instructions;

means for re-ordering and retiring instructions; and means for responding to a fault detected during a linear address translation of a faulting instruction, the means for responding including:
      means for storing information identifying the faulting instruction;
      means, connected to the means for storing, for determining whether a fault was detected for the faulting instruction at retirement thereof; and
      means for processing a fault detected during the linear address translation of the faulting instruction.

12. The system of claim 11, wherein said means for processing the fault includes:

means for flushing the computer system of all instructions; and means for executing micro-code configured for handling the fault.

13. The system of claim 11, wherein said means for storing information identifying the faulting instruction comprises:
      a fault register connected to the translation lookaside buffer means for storing the linear address and a fault type value representative of the fault detected;
      a register connected to the means for re-ordering for storing information identifying the faulting instruction; and wherein said means for processing the fault includes:
      means for determining that a fault had been detected for the faulting instruction at retirement thereof by accessing the register connected to the means for re-ordering; and
      means for accessing the fault register connected to the translation lookaside buffer means to determine the fault type value and the linear address for the faulting instruction.

14. The system of claim 13, wherein the fault register further is arranged to store an age value representative of an order position of an instruction relative to other instructions in a sequential instruction set, and wherein the means for storing information in the fault register includes:

means for determining whether information corresponding to a previous faulting instruction is stored in the fault register and, if so, comparing the age value of the faulting instruction with the age value of the previous faulting instruction to determine if the order position of the faulting instruction precedes that of the previous faulting instruction and, if so, for overwriting the fault register with fault information corresponding to the faulting instruction and, if not, for discarding the fault information corresponding to the faulting instruction.

15. A computer system comprising:

an instructions fetch and issue unit;

a non-blocking translation lookaside buffer;

a register for storing information identifying a faulting instruction;

a re-ordering buffer for determining whether a fault was detected by said translation lookaside buffer for the faulting instruction at retirement thereof; and a microcode execution unit, triggered by said re-ordering buffer, for executing microcode configured for handling the fault detected for the faulting instruction.

16. The computer system of claim 15, wherein said register for storing information identifying the faulting instruction comprises;
      a fault register connected to the translation lookaside buffer for storing the linear address and a fault type value representative of the fault detected;
      a register connected to the re-ordering buffer for storing information identifying the faulting instruction; and wherein said re-ordering buffer determines whether a fault had been detected for the faulting instruction at retirement thereof by accessing the register connected to the re-ordering buffer; and wherein said microcode execution unit accesses the fault register connected to the translation lookaside buffer to determine the fault type value and the linear address for the faulting instruction.

17. The computer system of claim 16, wherein the fault register further stores an age value representative of an order position of an instruction relative to that of other instructions in a sequential instruction set, and wherein said translation lookaside buffer determines whether information corresponding to a previous faulting instruction is stored in the fault register and, if so, compares an age value of the faulting instruction with an age value of the previous faulting instruction to determine if the order position of the faulting instruction precedes that of the previous faulting instruction, and if so, overwrites said fault register with fault information corresponding to the faulting instruction and, if not, discards the fault information corresponding to the faulting instruction.

18. A computer system comprising:

a plurality of microprocessors each having
      an instructions fetch and issue unit;
      a non-blocking translation lookaside buffer;
      a register for storing information identifying a faulting instruction;

a re-ordering buffer for determining whether a fault was detected by said translation lookaside buffer for the faulting instruction at retirement thereof; and a microcode execution unit, triggered by said re-ordering buffer, for executing microcode configured for handling a fault detected for the faulting instruction; and a memory;

an input/output unit; and a system bus interconnecting said microprocessors, said memory and input/output unit.

* * * * *